3,061,240
CONTROL SYSTEM FOR HELICOPTER
Frederick G. Adams, Hackettstown, N.J., assignor to The Bendix Corporation, Teterboro, N.J., a corporation of Delaware
Filed Nov. 18, 1960, Ser. No. 70,338
16 Claims. (Cl. 244—17.13)

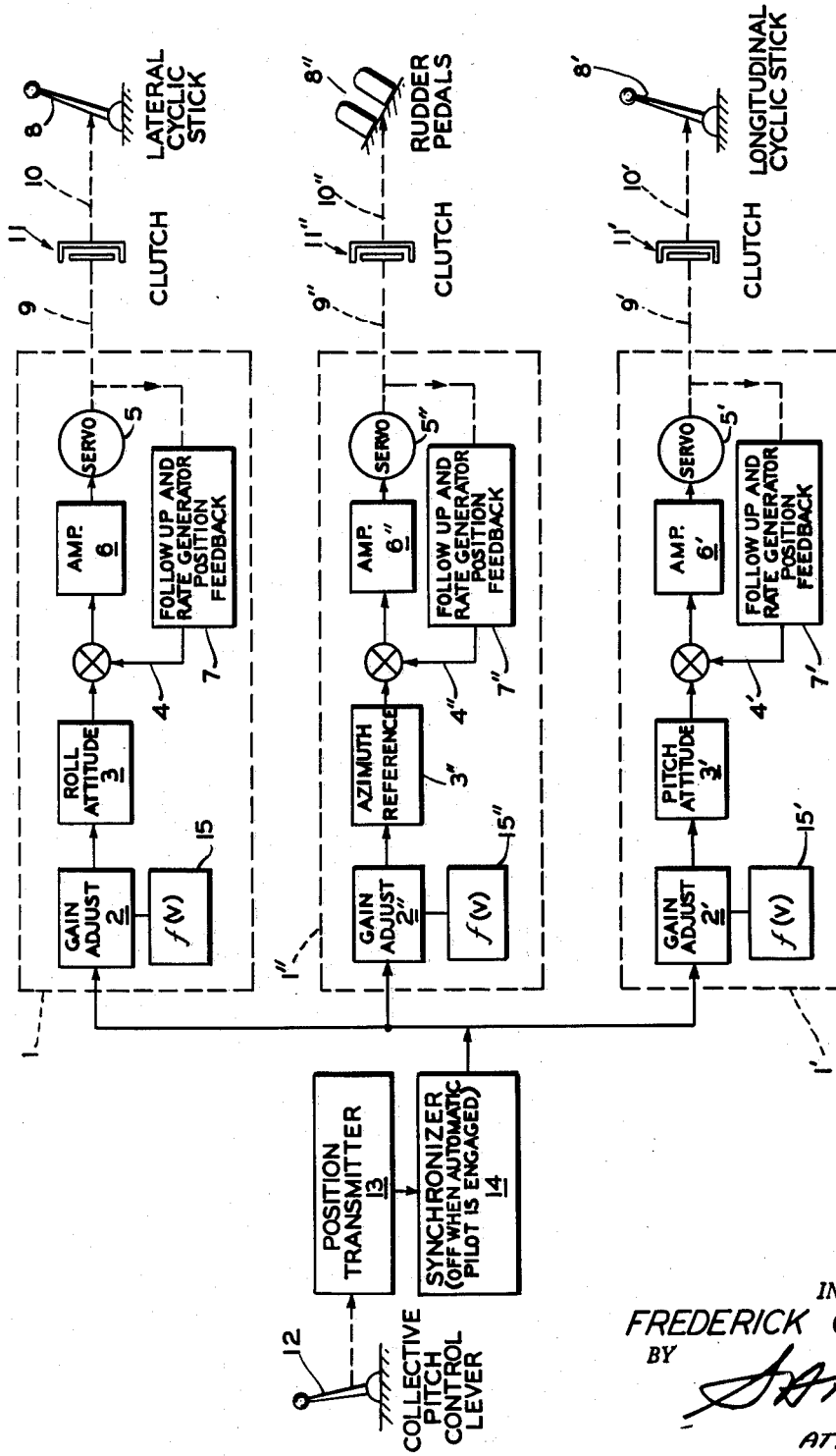

This invention, in general, relates to an autopilot system for rotary wing aircraft and more particularly to an automatic control system for providing attitude stabilization for helicopters about the pitch, roll, and yaw axes. The invention provides means for compensating for the trim changes required in the lateral cyclic pitch, longitudinal cyclic pitch, and tail rotor pitch, as a function of the change in the collective pitch of the sustaining rotor blades which occurs when an altitude adjustment is made.

The term lateral cyclic pitch as used herein refers to the variation in sustaining rotor blade pitch which is required to effect lateral movement of the helicopter. When the sustaining rotor blade is given a lateral cyclic pitch, its pitch is caused to reach a maximum when the blade substantially points directly away from the front or the rear of the helicopter, and a minimum when the blade substantially points directly away from either side of the helicopter. The term "longitudinal cyclic pitch" as used herein refers to the variation in sustaining rotor blade pitch which is required to effect movement of the helicopter in the forward or reverse directions. The pitch of the sustaining rotor blade thus reaches a maximum when said blade substantially points directly away from either side of the helicopter, and a minimum when the blade substantially points directly away from the front or the rear of the helicopter. It should also be noted here, that in the event neither the lateral cyclic pitch nor longitudinal cyclic pitch is zero, the sustaining rotor blade pitch will reach maximum when the blade substantially points directly away from the front or rear of either side of the helicopter, and minimum at one point between each of these position.

In general, helicopters utilizing one main rotor for sustaining the craft and a tail rotor for control of the heading of the craft, require that the lateral cyclic position, longitudinal cyclic position, and tail rotor position be trimmed in varying degree with changes in collective pitch. During take-offs and landings especially, the trim change requirement is very pronounced in the lateral cyclic and tail rotor control systems.

The reason for change requirements in the lateral cyclic and longitudinal cyclic pitch of the sustaining rotor when the collective pitch of the sustaining rotor is changed, may be seen from the following simplified explanation:

A change of collective pitch changes the pitch of the sustaining rotor blades a given amount, which is fixed throughout the entire 360° rotation of the blades. This change in collective pitch is superimposed upon the cyclic pitch settings of the rotor blades so that although the variation in pitch of the blades throughout their 360° rotation remains the same for each revolution, the average pitch has been changed by an amount equal to the change in collective pitch. Thus, the collective pitch setting affects the cyclic pitch settings, necessitating a correction by the pilot, in the lateral cyclic and longitudinal cyclic pitch of the blades each time the collective pitch of the blades is changed.

The need to vary the pitch of the tail rotor when the collective pitch of the sustaining rotor is changed occurs because of the change in torque exerted upon the aircraft by the sustaining rotor. This torque is exerted upon the aircraft as a reaction to the rotation of the sustaining rotor, and if not counterbalanced by an opposing torque, will cause the aircraft to rotate in a substantially horizontal plane. The function of the tail rotor is to produce this counterbalancing torque. However, a change in collective pitch of the sustaining rotor blades will cause a different amount of torque to be exerted by the blades of the sustaining rotor, thus causing a different reactive torque to be exerted upon the aircraft. If the counterbalancing torque exerted by the tail rotor should remain unchanged therefore, after the collective pitch of the sustaining rotor had been changed the aircraft would rotate in a substantially horizontal plane because the two aforementioned torques would be unequal and would no longer counterbalance each other. Therefore, the pilot must change the pitch of the tail rotor each time the collective pitch of the sustaining rotor is changed, so as to counterbalance the new reactive torque exerted upon the aircraft by the sustaining rotor, thereby preventing the aircraft from spinning.

It is now apparent that when the pilot of a helicopter makes a rapid or substantial change in the collective pitch setting, he must adjust or coordinate the lateral and longitudinal cyclic pitch settings and the tail rotor pitch settings, so as to keep the helicopter in a predetermined attitude. This requires the constant attention of the pilot whenever he changes the collective pitch setting for any reason whatever. If the pilot can be relieved of the necessity for making attitude trim readjustments after each adjustment in collective pitch, he will be less fatigued, resulting in an obvious gain in safety of helicopter operation. However, any system which automatically makes such attitude trim readjustments must have a high speed of response, without excessive overshoot. It is desirable to avoid use of attitude command integrators in such a system, because of the time lag in trim correction which they introduce. It is also desirable to provide means whereby the pilot can observe the appropriate automatic trim commands as movements of the attitude trim controls if he deems it necessary. Furthermore, upon engagement of the autopilot, it is desirable to avoid having transient signals fed to the pitch, roll, and yaw channels, the existence of which could throw the aircraft into an unstable and dangerous attitude.

One object of this invention is to provide automatic means to compensate for trim changes in the lateral displacement, longitudinal displacement, and heading of a helicopter, occurring due to operation of the collective pitch control.

It is another object of this invention to provide automatic means to rapidly compensate for trim changes in the lateral displacement, longitudinal displacement, and heading of a helicopter, occurring due to changes in the collective pitch of the sustaining rotor blades, by eliminating the necessity of using attitude command integrators.

It is a further object of this invention to provide automatic means to compensate for trim changes in the lateral displacement, longitudinal displacement, and heading of a helicopter, occurring due to changes in the collective pitch of the sustaining rotor blades, with the appropriate trim commands observable on the pilot's controls, through use of a parallel servo linkage.

It is a further object of this invention to provide a synchronizer for holding the output of the position transmitter which is fed to the pitch, roll, and yaw channels at zero when the automatic trim compensation system is disengaged, thereby preventing transient signals from being fed to the pitch, roll, and yaw channels upon engagement of the automatic trim compensation system.

These and other objects of the invention will be more manifest from the following specification and drawings and more particularly set forth in the claims.

In the drawing, the single FIGURE is a schematic showing of the automatic control system embodying the present invention.

Referring to the figure, the lateral cyclic control means is represented by the lateral cyclic pitch or "roll" control channel 1, the longitudinal cyclic pitch, or "pitch" represented by the longitudinal cyclic pitch, or "pitch" control channel 1', and the tail rotor control means is represented by the heading, or "yaw" control channel 1".

The lateral cyclic pitch and the longitudinal cyclic pitch control channels 1, 1' each comprise an adjustable gain device 2, 2', and an automatic pilot which may include an attitude gyro 3, 3' and suitable damping networks, and an individual axis servo loop 4, 4'. Each individual axis servo loop comprises a servomotor 5, 5', which alters the lateral cyclic pitch and longitudinal cyclic pitch respectively of the sustaining rotor, an amplifier 6, 6' for driving the associated servomotor 5, 5', and a feedback loop comprising a follow-up and rate generator 7, 7' for providing position feedback in the associated servo loop 4, 4'.

The heading control channel 1" comprises an adjustable gain device 2", and an automatic pilot which may include an azimuth reference directional gyro 3" and suitable damping networks and a yaw servo loop 4". The yaw servo loop comprises a servomotor 5" which alters the pitch of the tail rotor blades, an amplifier 6" for driving servomotor 5", and a feedback loop comprising a follow-up and rate generator 7" for providing position feedback in the yaw servo loop 4".

The outputs of servomotors 5, 5', and 5" may be mechanically coupled to the manual controls 8, 8', and 8" through mechanical linkages 9 and 10, 9' and 10', and 9" and 10", connected by clutches 11, 11', and 11", so that when servomotors 5, 5', and 5" are operated to change their respective rotor blade pitches as a result of a change in collective pitch, the motion of the servomotors will be indicated to the pilot of the craft by movement of the manual controls 8, 8', and 8", provided the clutches 11, 11', and 11" have been engaged.

A collective pitch control lever 12 is connected to a position transmitter 13 which may be a synchro, a potentiometer, or some other device which produces an electrical signal, the magnitude of which is proportional to the position of collective pitch control lever 12. The output of position transmitter 13 is fed to synchronizer 14, which in turn feeds the collective pitch signal to the individual axis control channels 1, 1', and 1". The output of synchronizer 14 is held at zero whenever the automatic control system is disengaged, so as to prevent the occurrence of any transient signals which would be fed to the pitch, roll, and yaw control channels upon engagement of the synchronizer.

With the automatic control system disengaged while in flight, when the pilot moves collective pitch lever 12 he must readjust lateral cyclic control 8, longitudinal cyclic control 8', and heading control 8". However, upon engagement of the automatic control system, the collective pitch signal from position transmitter 13 is fed through synchronizer 14 to the roll, pitch, and yaw control channels, providing a signal at each of the channels which automatically effects the necessary trim adjustments, obviating the necessity for the pilot to make these adjustments manually.

In the control systems for each axis, the signal from position transmitter 13 is fed through adjustable gain devices 2, 2', and 2", such as amplifiers, and is added algebraically to the signals from attitude gyros 3, 3', and 3" and associated damping networks and the resultant signal is proportional to the change in moments about the center of gravity in the particular axis involved, caused by the change in collective pitch. This resultant signal, which in each axis now represents the amount of trim signal necessary to maintain the original attitude of the aircraft about the particular axis involved, is passed to the individual axis servo loops 4, 4', and 4". Here the signal is fed to amplifiers 6, 6', and 6" which drive servomotors 5, 5', and 5" to change the pitch of the rotor blades, in the manner heretofore described, thereby keeping the aircraft in its predetermined attitude. The rate generators in position feedback loops 7, 7', and 7" provide damping signals for servomotors 5, 5', and 5" so as to allow maximum speed of response with minimum overshoot.

The function of clutches 11, 11', and 11" in conjunction with mechanical linkages 9, 9', and 9" and 10, 10', and 10" in allowing an indication to the pilot of the automatic trim changes produced, has been heretofore described.

In some instances it may be desirable to adjust the gain of adjustable gain devices 2, 2', 2" in response to velocity or other variable of the craft by means 15, 15', and 15" operable in accordance with a function of the variable to more effectively maintain the craft automatically in the desired attitude.

The invention described herein is applicable when the collective pitch lever is operated manually to change altitude of the craft, or automatically through an altitude controller or rate of change of altitude controller.

The novel arrangement described herein and constructed according to the invention automatically compensates for trim changes required upon operation of the collective pitch control in the lateral displacement, longitudinal displacement, and heading of the helicopter to maintain the helicopter in a predetermined attitude.

Although one embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. In a control system for a rotary wing aircraft having collective pitch control means for varying the altitude of the aircraft and means for controlling lateral displacement, longitudinal displacement and heading of the aircraft, means for providing signals corresponding to movement of the collective pitch control means, means for applying the signals to the means for controlling lateral displacement, longitudinal displacement and heading of the aircraft to automatically compensate for trim changes required therein to maintain the aircraft in a predetermined attitude due to movement of the collective pitch control means.

2. A control system for a helicopter having a sustaining rotor and a tail rotor, comprising lateral cyclic control means for control of the lateral cyclic pitch of said sustaining rotor including a first adjustable gain device, a first servo loop and a roll attitude gyro connected between the first adjustable gain device and the first servo loop, longitudinal cyclic control means for control of the longitudinal cyclic pitch of said helicopter including a second adjustable gain device, a pitch attitude gyro, and a second servo loop said pitch attitude gyro connected between said second adjustable gain device and said second servo loop; tail rotor control means for control of the pitch of said tail rotor including a third adjustable gain device, an azimuth reference directional gyro, and a third servo loop said azimuth reference directional gyro connected between said third adjustable gain device and said third servo loop; collective pitch control means for control of altitude of said helicopter including a position transmitter to produce signals corresponding to the collective pitch of said sustaining rotor, and a synchronizer connected from the output of said position transmitter to the inputs of said first, second and third adjustable gain devices.

3. A control system as defined in claim 2 wherein said servo loops each comprise an amplifier driving a servomotor, with a follow-up and rate generator position feedback means connected from the output of said servomotor to the input of said amplifier.

4. A control system as defined in claim 3 wherein said servomotor of each of said servo loops is mechanically connected through clutch means to a manual control so that attitude trim changes may be observed as movements of the manual controls.

5. In a control system for a rotary wing aircraft having collective pitch control means, lateral cyclic control means, longitudinal cyclic control means, and tail rotor control means, automatic trim compensation means for providing signals required to maintain the aircraft in a predetermined attitude and corresponding to displacement of the collective pitch control means to the lateral cyclic, longitudinal cyclic and rotor control means to automatically compensate for trim changes due to movement of the collective pitch control means, and synchronizer means to provide zero signal to all of said control means while said automatic trim compensation means are disengaged.

6. In a control system for a rotary wing aircraft having collective pitch control means for control of the altitude of said aircraft, cyclic pitch control means for control of lateral displacement and longitudinal displacement of said aircraft, and tail rotor control means for controlling the heading of said aircraft, automatic means responsive to the collective pitch control means to compensate for trim changes required in the lateral displacement, longitudinal displacement, and heading of said aircraft occurring due to changes in the collective pitch control means.

7. A control system as defined in claim 6 wherein said automatic means is operable by the collective pitch control means and controls the cyclic pitch control means and tail rotor control means.

8. In a control system for a rotary wing aircraft having collective pitch control means for control of the altitude of said aircraft, pitch control means for control of lateral displacement and longitudinal displacement of said aircraft, and tail rotor control means for controlling the heading of said aircraft, automatic means to compensate for trim changes in the lateral displacement, longitudinal displacement, and heading of the aircraft occurring due to operation of said collective pitch control means, said automatic means comprising signal paths from said collective pitch control means to said pitch control means for control of lateral displacement and longitudinal displacement of said aircraft and to said tail rotor control means.

9. In a control system for a rotary wing aircraft having collective pitch control means for control of the altitude of said aircraft, and means for control of lateral displacement, longitudinal displacement, and heading of said aircraft, automatic means to compensate for trim changes in the lateral displacement, longitudinal displacement, and heading of said aircraft occurring due to operation of said collective pitch control means, said automatic means comprising signal paths from said collective pitch control means to said means for control of lateral displacement, longitudinal displacement, and heading of said aircraft.

10. In a control system for a rotary wing aircraft having means for control of the altitude of said aircraft and means for control of lateral displacement, longitudinal displacement, and heading of said aircraft, automatic means to compensate for trim changes in the lateral displacement, longitudinal displacement, and heading of said aircraft occurring due to operation of the altitude control means, said automatic means comprising signal paths from said collective pitch control means to said means for control of lateral displacement, longitudinal displacement, and heading of said aircraft.

11. In a control system for a rotary wing aircraft having manual collective pitch control means for control of altitude of said aircraft, manual and automatic lateral cyclic pitch control means for control of lateral displacement of said aircraft, manual and automatic longitudinal cyclic pitch control means for control of longitudinal displacement of said aircraft, and manual and automatic tail rotor control means for control of heading of said aircraft, means to automatically compensate for trim changes in the lateral displacement, longitudinal displacement, and heading of said aircraft occurring due to operation of said manual collective pitch control means comprising each of said automatic means for control of lateral displacement, longitudinal displacement, and heading of said aircraft respectively, and signal paths from said collective pitch control means to each of said automatic means.

12. A control system as defined in claim 11 wherein said automatic means to compensate for trim changes in the lateral displacement, longitudinal displacement, and heading of said aircraft are mechanically connected to the manual control means for lateral displacement, longitudinal displacement, and heading of said aircraft respectively so that attitude trim changes may be observed as movements of said manual control means.

13. A control system as defined in claim 11 wherein said automatic means to compensate for trim changes in the lateral displacement, longitudinal displacement, and heading of said aircraft are mechanically connected by clutch means to the manual control means for lateral displacement, longitudinal displacement, and heading of said aircraft respectively so that attitude trim changes may be observed as movements of said manual control means.

14. In a control system for a rotary wing aircraft having means for control of the altitude of said aircraft and means for control of the attitude of said aircraft, automatic means to compensate for trim changes in the attitude of said aircraft occurring due to the operation of said altitude control means comprising signal paths from said means for control of the altitude to said means for control of the attitude.

15. In a control system for a rotary wing aircraft having collective pitch control means, lateral cyclic control means, longitudinal cyclic control means, and tail rotor control means, automatic trim compensation means for providing signals required to maintain the aircraft in a predetermined attitude and corresponding to displacement of the collective pitch control means to the lateral cyclic, longitudinal cyclic and rotor control means to automatically compensate for trim changes due to movement of the collective pitch control means.

16. In a control system for a rotary wing aircraft having collective pitch control means for varying the altitude of the aircraft and means for controlling lateral displacement, longitudinal displacement and heading of the aircraft, means for providing signals corresponding to movement of the collective pitch control means, means for altering the signals in response to a function of a variable of the aircraft, means for applying the altered signals to the means for controlling lateral displacement, longitudinal displacement and heading of the aircraft to automatically compensate for trim changes required therein to maintain the aircraft in a predetermined attitude due to movement of the collective pitch control means.

References Cited in the file of this patent

UNITED STATES PATENTS

| | | |
|---|---|---|
| 2,479,549 | Ayers | Aug. 23, 1949 |
| 2,650,046 | Vanderlip | Aug. 25, 1953 |
| 2,947,498 | Guarino | Aug. 2, 1960 |